July 5, 1938. A. W. ASHLEY 2,123,035
TANK CONSTRUCTION
Filed July 1, 1935 2 Sheets-Sheet 2

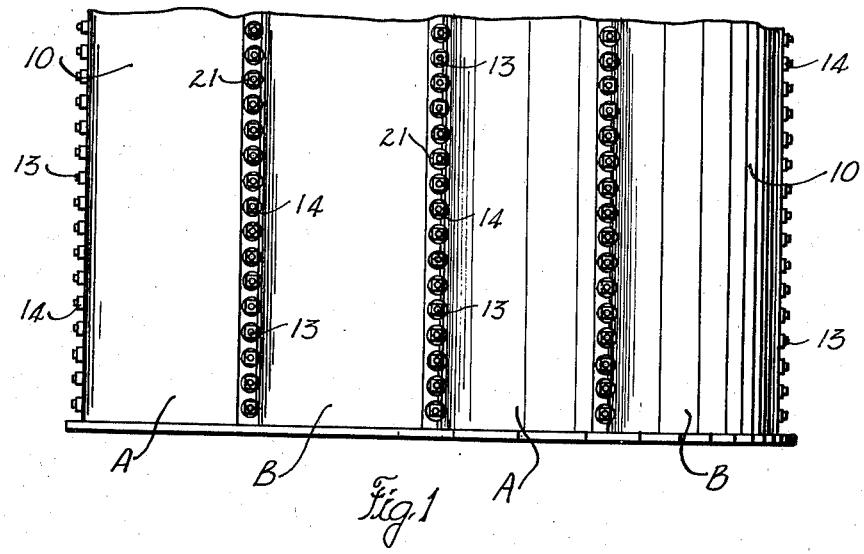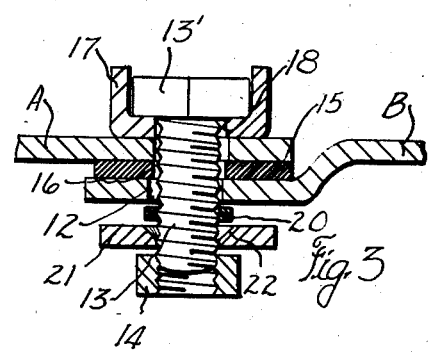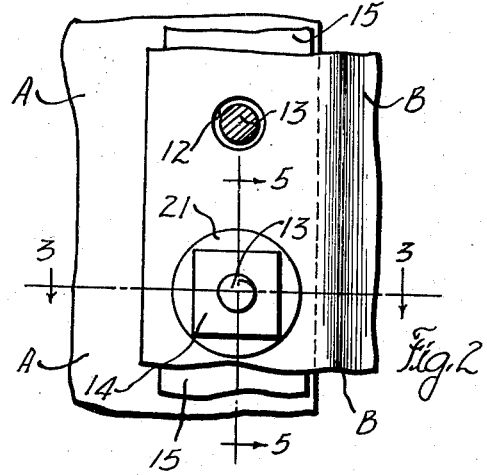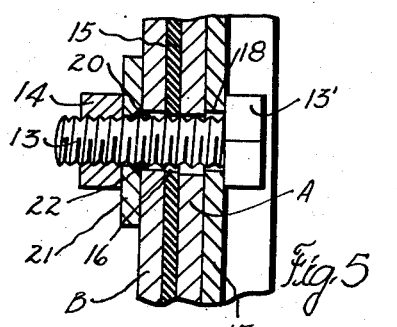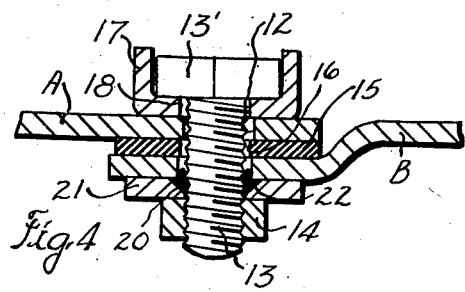

Inventor
Arthur W. Ashley
By Jack Ashley
Attorney

Patented July 5, 1938

2,123,035

UNITED STATES PATENT OFFICE 2,123,035

TANK CONSTRUCTION

Arthur W. Ashley, Houston, Tex.

Application July 1, 1935, Serial No. 29,207

1 Claim. (Cl. 220—75)

This invention relates to new and useful improvements in tank construction.

One object of the invention is to provide improved means for securely fastening the metallic sheets, or plates of a tank together, said means being so constructed that the joint between each sheet is positively fluid tight and leak proof.

An important object of the invention is to provide an improved fastening for connecting the overlapping metallic sheets, or plates of a tank, said fastening including bolts arranged to pass through openings in the sheets and also including a resilient packing ring for each bolt with means for crowding said ring into the openings around said bolt, whereby leakage through said openings is positively prevented.

Another object of the invention is to provide resilient packing rings arranged to pack off the usual bolt holes in the metallic sheets of a tank, whereby the tank joints are fluid tight, the resiliency of the rings permitting expansion and contraction of the metal sheets under varying weather conditions, without disturbing the seal formed by said ring.

A further object of the invention is to provide a resilient packing ring arranged to surround the usual fastening bolt, adjacent the opening in the metallic sheet of a tank with means on the bolt head for crowding said ring into the opening around said bolt when the bolt is tightened.

Still another object of the invention is to provide an improved tank fastening for connecting the overlapping sheets of a tank, said fastening including bolts arranged to pass through openings in the sheets and a resilient packing ring surrounding each bolt adjacent the opening through which it passes, together with auxiliary means engaging said rings to force them into the openings around the bolts to pack off said openings and prevent leakage when the bolts are tightened.

A still further object of the invention is to provide improved means for positively packing off the usual fastening bolt holes of overlapping metallic sheets of a tank to positively prevent leakage therethrough, whereby said holes may be made larger to make for their easier registration during assembly, which facilitates assembly of the tank.

A construction designed to carry out the invention will be hereinafter described, together with other features of the invention.

Figure 6:
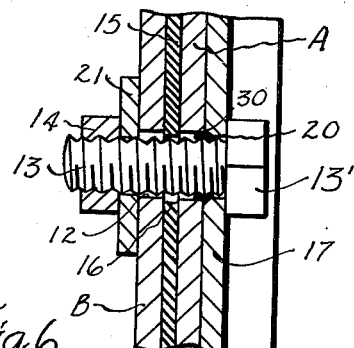
Figure 7:
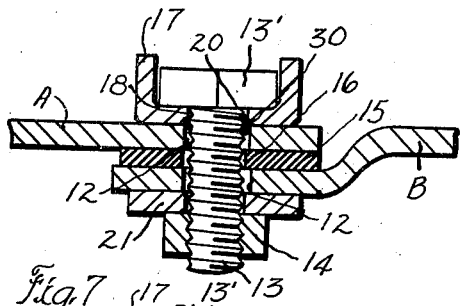
Figure 9:
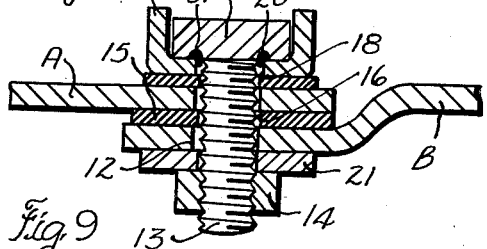
Figure 8:
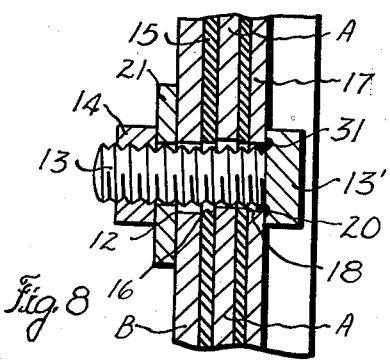
Figure 11:
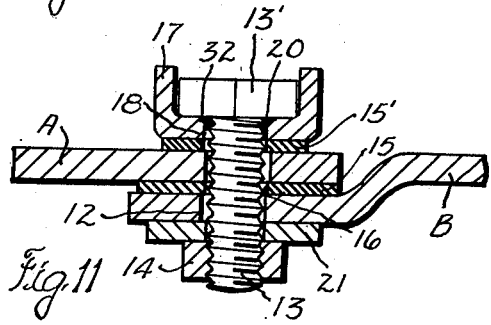
Figure 10:
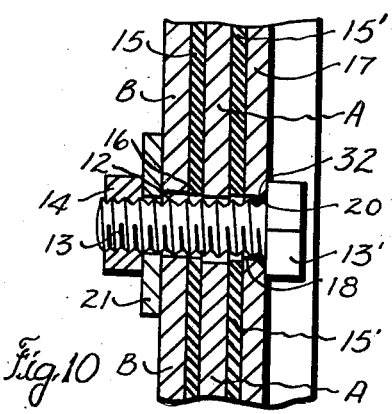
Figure 12:
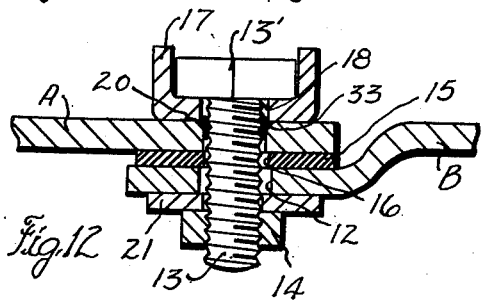

The invention will be more readily understood from a reading of the following specification and by reference to the accompanying drawings, in which an example of the invention is shown, and wherein:

Figure 1 is a partial elevation of a metal tank provided with a fastening means constructed in accordance with the invention, Figure 2 is an enlarged elevation of the fastening means, Figure 3 is a horizontal, cross-sectional view, taken on the line 3—3 of Figure 2, and showing the nut loose on the fastening bolt, Figure 4 is a view, similar to Figure 3, and showing the nut tightened on the fastening bolt, Figure 5 is a transverse, vertical, sectional view, taken on the line 5—5 of Figure 2, Figure 6 is a transverse, vertical sectional view of another form of the invention, Figure 7 is a horizontal, cross-sectional view of the same, Figure 8 is a transverse, vertical sectional view of another form of the invention, Figure 9 is a horizontal, cross-sectional view of the same, Figure 10 is a transverse, vertical, sectional view of still another form of the invention, Figure 11 is a horizontal, cross-sectional view of the same, and Figure 12 is a horizontal, cross-sectional view of still another form of the invention.

In the drawings, the numeral 10 designates a portion of a metal tank which is constructed of a plurality of metal sheets or plates A and B. Each plate has a plurality of spaced openings 12 along its vertical edge and each sheet (Fig. 3) has one vertical edge offset so as to overlap the adjacent sheet. When the edges of the sheet overlap, the spaced openings 12 register with each other, whereby fastening bolts 13 which receive nuts 14 may be inserted through the openings to securely fasten the sheets together. The sheets may, of course, vary in size, thickness and shape depending on the size of the tank being constructed.

In assembling the usual tank, an elongated strip of packing material 15 is inserted between the overlapping edges of the tank sheets A and B, as is clearly shown in Figures 2 to 5. This packing strip extends vertically throughout the height of the tank and serves to prevent leakage between the vertical edges of the sheets. Each strip is provided with spaced openings 16, which register with the openings 12 of the tank sheets, whereby the bolts 13 may pass therethrough.

For bracing the tank throughout its height, an elongated vertical channel bar 17 is disposed vertically within the tank at the overlapping edges of the sheets and lies contiguous to the inner wall of said tank throughout its length. The channel bar is provided with a plurality of spaced openings 18 which register with the openings 12 in the overlapping edges of the sheets, whereby the bolts 13 pass through the bar, sheets and packing strip. The channel bar is of such width as to receive the square bolt head 13' of the bolt and it is obvious that when the bolt is inserted through the various members, as shown in Figures 3 and 4, the channel bar 17 serves to prevent rotation of said bolt when the nut 14 is tightened on its outer end.

It has been found that due to irregularities in punching the openings 12 and 18 in the sheets and channel bar 17, it is difficult, and practically impossible, to make the openings only large enough to receive the bolts, and yet make each register when the sheets are overlapped and the bar positioned. Therefore, it is necessary to make the openings 12 and 18 larger than the bolts 13, whereby irregularities or partial mis-registration of two of the openings will not prevent the bolts passing therethrough. Since the openings are comparatively larger in diameter than the bolts, it is obvious that the fluid within the tank will escape through said openings around the bolts, thereby making the tank ineffective for storage.

For making these openings fluid-tight and to prevent leakage around the fastening bolts 14, a resilient packing ring 20 is snugly fitted on the outer end of each bolt and is located to engage the exterior of the tank wall. This ring is preferably made of rubber, rubber compound, or similar material but may be constructed of very soft metal or other material having sufficient resiliency to permit distortion thereof. The ring is placed over the outer end of the bolt 13 before the nut 14 is screwed thereon and after said ring is in position, a metal washer 21 is engaged over the outer end of the bolt adjacent said ring.

The inner end of the bore of the washer is beveled at 22 and it will be seen that this bevel is arranged to engage the outer edge of the resilient ring 20. After both ring and washer are surrounding the bolt, the nut 14 is then screwed onto the outer end of said bolt. It is obvious that as said nut is rotated and travels inwardly on the bolt, the ring 20 and washer 21 are forced inwardly, whereby the washer is held against rotation by its frictional contact with the elastic ring.

It is pointed out that the washer 21 does not rotate with the nut, so that as said nut is tightened, the bevel 22 of said washer forces the resilient ring into the opening 12 of the outer sheet around the threads of the bolt, as clearly shown in Figure 4. The non-rotating washer moves inwardly in a straight line and its bevel distorts the resilient ring equally in all directions, to positively seal the opening. It is noted that since the washer does not rotate, the danger of grinding or tearing the resilient ring while it is being crowded into the opening is eliminated. This grinding or tearing of said ring occurs in the usual practice where said ring is forced into its packing engagement by a rotating member. It is pointed out that if a metallic packing ring were used, it would be unnecessary to move the ring into packing engagement through the employment of a stationary member because a metallic ring would not be subject to tearing by frictional contact, as is the resilient ring 20.

After the nut 14 has been tightened, it will be seen that the resilient packing ring is crowded into the opening 12 of the outer sheet B (Fig. 4) and snugly engages the threads of the bolt 13 to form a positive seal to prevent leakage through said opening. The washer having the bevel and being non-rotatable assures the resilient ring remaining intact during the tightening operation. Further, after the complete tank has been assembled, it is obvious that the resiliency of the ring will permit the tank sheets to expand and contract under varying weather conditions without breaking the seal because the ring will merely follow the movement of the sheets due to its resiliency. By providing the leak tight seal at the openings, it is possible to make the openings larger which will compensate for irregularities in punching said holes, whereby their registration is assured which makes for easier and more rapid assembly. The non-rotatable washer 21 forces the resilient packing ring 20 into its packing position without any danger of grinding or tearing the ring and also the bevel distorts the same equally in all radial directions which assures a positive fluid-tight seal.

In Figures 6 and 7, a modified form of the invention is shown. In this form the outer edge of each opening 18 in the channel bar 17 is beveled at 30, and the resilient packing ring 20 surrounds the bolt 13 between the channel bar and the tank sheet A. When the nut 14 is tightened on the bolt, it is obvious that the packing ring will be crowded into the opening 12 of the sheet A and will snugly engage around the threads of the bolt 13. Since the channel bar does not turn but is stationary, it will be seen that the ring will not be damaged but will be forced into the opening, equally, whereby the openings are made leak proof.

In Figures 8 and 9, another form of the invention is shown, wherein the underside of the bolt head 13' is formed with an annular recess 31. The packing ring 20 is located directly beneath the head of the bolt adjacent the outer side of the channel bar 17. When the nut 14 is tightened on the bolt 13, the ring is crowded into the opening 18 in the bar 17, whereby leakage through the openings is prevented.

In Figure 12, still another form of constructing invention is shown. This form is similar to that shown in Figures 6 and 7, except that the inner edge of the bore 18 of the channel bar is beveled at 32, the packing ring 20 surrounding the bolt 13 between the head 13' thereof and the channel bar. In this form an auxiliary vertical packing strip 15' is disposed between the inner sheet A and the channel bar 17 to prevent leakage therebetween. Since neither the bar or head rotate, it will be seen that the same results as those obtained in the other forms will be accomplished by this form.

In Figure 12, still another form of construting the invention is shown. The inner end of the bore 12 of the sheet A is beveled at 33 and the packing ring 20 is inserted between said sheet and the channel. In all forms, the packing ring is crowded into packing engagement by a non-rotatable member which prevents damage to said rings, and also which permits an equal pressure to be applied to the ring. The resilient packing ring is employed in all forms so that expansion and contraction of the metal sheets, due to weather variations, will not break the seal by breaking the ring, as would be the case if a metal ring were used. The resilient ring will merely distort along with the movement of the sheets under heat and cold, and the positive, fluid-tight seal will be maintained.

What I claim and desire to secure by Letters Patent is:

A tank construction including, a plurality of metallic sheets having their vertical edges overlapping and having registering openings in their overlapping edges, threaded bolts adapted to be passed through said openings, a nut on the outer end of each bolt, a resilient packing ring surrounding the outer end of each bolt adjacent the opening through which said bolt passes, and a metallic washer interposed on the bolt between the packing ring and nut and having a conical bore substantially fitting the bolt adjacent to the nut, the flare of the bore engaging the packing ring to crowd the same into the opening and around the bolt when the nut is tightened to pack off the opening.

ARTHUR W. ASHLEY.